(12) United States Patent
Burke et al.

(10) Patent No.: US 6,466,994 B1
(45) Date of Patent: Oct. 15, 2002

(54) METHOD AND SYSTEM FOR PROGRAMMING A SYSTEM BOARD USING A PERIPHERAL CONTROLLER

(75) Inventors: Thomas Charles Burke, Durham; Richard Alan Dayan, Wake Forest; Eric Richard Kern, Durham, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,850

(22) Filed: Mar. 31, 1999

(51) Int. Cl.$^7$ .............. G06F 13/10; G06F 9/06
(52) U.S. Cl. ............... 710/8; 710/10; 710/15; 710/19; 711/100
(58) Field of Search ................ 710/8, 10, 15, 710/19; 711/100

(56) References Cited

U.S. PATENT DOCUMENTS

| | | | | | |
|---|---|---|---|---|---|
| 5,111,423 A | * | 5/1992 | Kopec, Jr. et al. | .......... | 395/500 |
| 5,613,092 A | * | 3/1997 | Lim et al. | .......... | 395/500 |
| 5,784,581 A | | 7/1998 | Hannah | .......... | 395/290 |
| 5,787,259 A | | 7/1998 | Haroun et al. | .......... | 395/200.83 |
| 5,799,196 A | | 8/1998 | Flannery | .......... | 395/750.03 |
| 5,841,424 A | | 11/1998 | Kikinis | .......... | 345/168 |
| 5,845,151 A | | 12/1998 | Story et al. | .......... | 395/847 |
| 6,029,155 A | * | 2/2000 | Bass et al. | .......... | 705/401 |
| 6,061,752 A | * | 5/2000 | Jones et al. | .......... | 710/103 |

* cited by examiner

Primary Examiner—Jeffrey Gaffin
Assistant Examiner—Rehana Perveen
(74) Attorney, Agent, or Firm—Sawyer Law Group, LLP; J. Bruce Schelkopf; John David Flynn

(57) ABSTRACT

A method and system for programming a computer board including a nonvolatile storage is disclosed. The nonvolatile storage is for storing a program. The method and system include providing a peripheral controller coupled with the nonvolatile storage and coupling the peripheral controller with a host system. The method and system further include allowing the system board to be recognized by the host system as a peripheral. The method and system further include loading the program from the host system to the nonvolatile storage.

17 Claims, 8 Drawing Sheets

METHOD AND SYSTEM FOR PROGRAMMING A SYSTEM BOARD USING A PERIPHERAL CONTROLLER

FIELD OF THE INVENTION

The present invention relates to manufacture of computer boards and more particularly to a method and system for programming nonvolatile storage on the computer board.

BACKGROUND OF THE INVENTION

Currently, conventional methods for manufacturing computer systems include fabrication of conventional system boards and the assembly of components on the conventional system board. The conventional system board, such as a motherboard, typically includes nonvolatile storage, such as flash memory or other EEPROMs. The nonvolatile storage typically stores the program(s), or code, for the basic input output system (BIOS) for the computer system or the code that. is stored in read only memory (ROM). The program(s) stored in the nonvolatile storage is typically referred to as firmware.

The program(s) are typically loaded onto the conventional system board during manufacture. Other portions of the conventional system board, such as the processor, memory, or other devices are also attached during manufacture. Once manufacture of the conventional system board is complete, the conventional system board is capable of functioning. The conventional system board is typically stored until it is to be placed in a computer system. When the conventional system board is to be placed in a computer system, any updates to the program(s) are loaded into nonvolatile storage. The system board is then placed into a computer system.

Although a computer system can be manufactured in this manner, there are frequently updates to the firmware. Consequently, it may be highly improbable that the program (s) loaded onto the nonvolatile storage at time of manufacture are the program(s) that will be used when the whole computer system is manufactured. Thus, the program(s) must generally be reloaded using the updated version of the program(s) prior to placing the system board into a computer system. Reloading the program(s) adds time and expense to manufacturing of the computer system. In addition, reloading the program(s) removes advantages gained by utilizing a business partner or vendor to assemble portions of the system board.

Accordingly, what is needed is a system and method for manufacturing a system board which reduces the need to reload program(s). The present invention addresses such a need.

SUMMARY OF THE INVENTION

The present invention provides a method and system for programming a computer board including a nonvolatile storage. The nonvolatile storage is for storing a program. The method and system comprise providing a peripheral controller coupled with the nonvolatile storage and coupling the peripheral controller with a host system. The peripheral controller allows the host system to recognizing the computer board as a peripheral. The method and system further comprise loading the program from the host system to the nonvolatile storage.

According to the system and method disclosed herein, the present invention provides a mechanism for programming the nonvolatile storage at any point in manufacture. Thus, the latest version of the BIOS or other firmware can be loaded into the nonvolatile storage at any time in manufacture. Consequently, manufacture of computer boards is simplified and made more cost effective.

DETAILED DESCRIPTION OF THE INVENTION

The present invention relates to an improvement in manufacturing system boards and computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
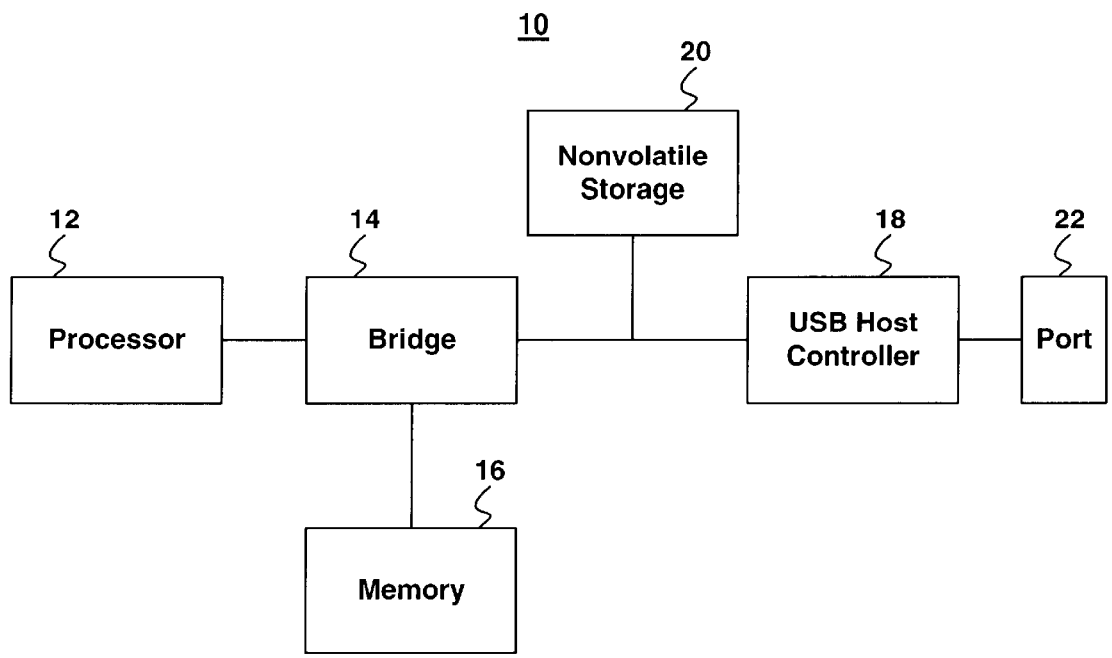
FIG. 1 is a block diagram of a conventional system board.

FIG. 1 is a block diagram of a conventional system board 10. The conventional system board 10 includes a processor 12, a memory 16, and a bridge 14 coupled with the processor 12 and the memory 16. The conventional system board 10 also includes a host controller 18, depicted as a universal serial bus (USB) host controller 18, coupled with the bridge 14. The host controller is coupled with a port 22, depicted as a USB port 22. The conventional system board 10 also includes a nonvolatile storage 20 coupled with the bridge 14. The nonvolatile storage 20 may include a flash EEPROMs or other devices that may be used as a read only memory (ROM). Thus, the nonvolatile storage 20 typically includes more than one component. The nonvolatile storage 20 is used to store a program(s), or code, for the conventional system board 10. For example, the nonvolatile storage 20 may store the code for the basic input output system (BIOS), Ethernet code for some of the devices on the conventional system board 10, or other firmware for the conventional system board 10.

Figure 2:
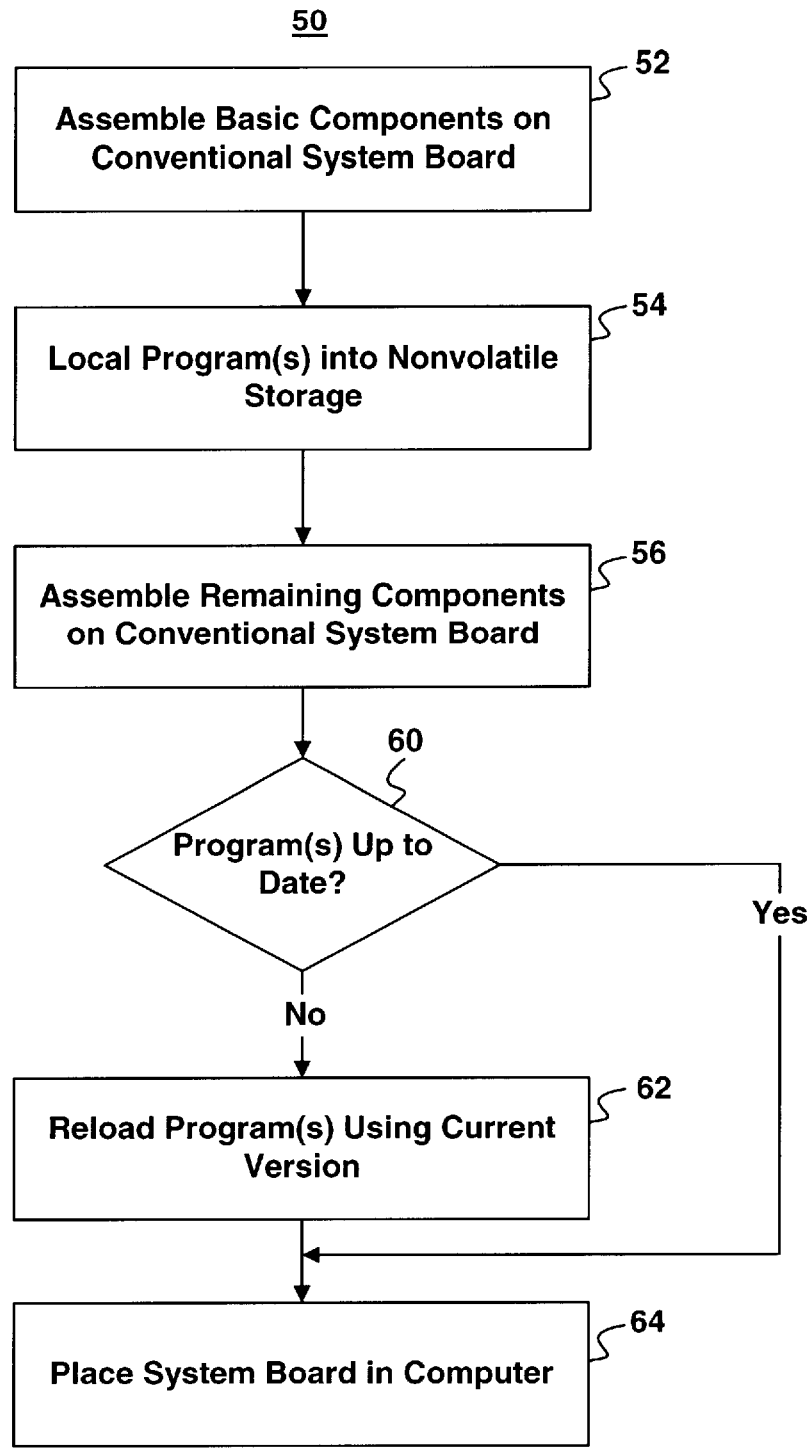
FIG. 2 is a flow chart depicting a conventional method for manufacturing a computer system including the conventional system board.

FIG. 2 depicts a flowchart of a conventional method 50 for manufacturing computer systems using the conventional system boards 10. The basic components of the conventional system boards 10 are assembled onto circuit boards, via step 52. Typically, step 52 includes providing components such as the nonvolatile storage 10 to each conventional system board 10 being manufactured. The program(s), or firmware, are then loaded into the nonvolatile storage. 20 of each conventional system board 10, via step 54. The program(s) loaded in step 54 are the current version of the program(s) in existence at the time of manufacture of the conventional system board 10. The remaining portions of each conventional system board 10 are then assembled, via step 56. For example, step 56 includes providing the processor 12 and the memory 16 on each conventional system board 10. Once step 56 is completed, the conventional system boards 10 are functional because all components and firmware have been provided. Using steps 52 through 56 a large number of similar conventional system boards 10 are typically manufactured.

The conventional system boards 10 are then stored until the conventional system boards 10 are to be placed in computer systems (not shown), via step 58. The time that the conventional system boards 10 are stored may vary widely. It is then determined whether the conventional system boards 10 to be used include an up to date version of the program(s), via step 60. If so, then step 64, discussed below, is performed. If not, then the program(s) are reloaded in each conventional system board 10 to be used, via step 62. Because the program(s) were originally loaded in step 52, each conventional system board 10 can be used to update itself in step 62. The conventional system boards 10 are then placed in computer systems, via step 64.

Although the method 50 depicted in FIG. 2 functions, one of ordinary skill in the art will readily realize that reloading the program(s) for the conventional system board 10 is time consuming. Furthermore, reloading the program(s) for the conventional system board 10 also increases the cost of development of the computer system. Because reloading the program(s) for the conventional system board 10 is typically done by the manufacturer of the computer system, reloading the program(s) after manufacture of the conventional system board 10 is complete reduces or nullifies the advantages of outsourcing assembly of portions of the conventional system board 10.

The present invention provides a method and system for programming a computer board including a nonvolatile storage. The nonvolatile storage is for storing a program. The method and system comprise providing a peripheral controller coupled with the nonvolatile storage and coupling the peripheral controller with a host system, such as an Intel 8×930A× USB microcontroller. The peripheral controller allows the host system to recognize the computer board as a peripheral. The method and system further comprise loading the program from the host system to the nonvolatile storage.

The present invention will be described in terms of a system board having particular components. However, one of ordinary skill in the art will readily recognize that this method and system will operate effectively for other components or other types of components. For example, although the present invention is discussed in the context of a USB interface, one of ordinary skill in the art will readily recognize that the method and system can be used with another Interface.

Figure 3A:
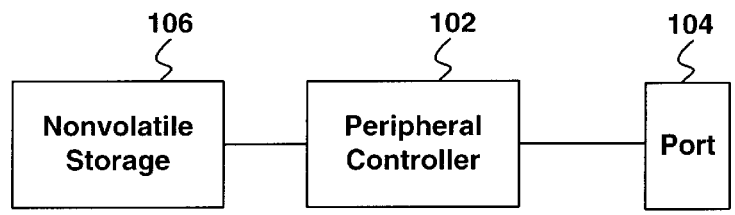
FIG. 3A is a block diagram of a system board in accordance with the present invention.

To more particularly illustrate the method and system in accordance with the present invention, refer now to FIG. 3A, depicting one embodiment of a system board 100 in accordance with the present invention. For clarity, only certain components of the system board 100 are depicted. Nothing prevents the system board 100 from having additional components.

The system board 100 includes a peripheral controller 102, a port 104, and a nonvolatile storage 106. The nonvolatile storage 106 may include one or more flash EEPROMs or other device that may be used as a ROM. The nonvolatile storage 106 may. include more than one storage device. The nonvolatile storage 106 is used to store a program or programs for the system board 100. For example, the nonvolatile storage 100 may store the code for the basic input output system (BIOS), Ethernet code for some of the devices on the system board 100, or other firmware for the conventional system board 100.

The peripheral controller 102 is preferably a USB peripheral controller. The peripheral controller 102 allows the system board 100 to behave as a peripheral to a host system (not depicted in FIG. 3A). For example, if the peripheral controller 102 is a USB peripheral controller, the peripheral controller 102 allows the system board 100 to be recognized and treated as a USB peripheral for the host system. The peripheral controller 102 also allows the nonvolatile storage 106 to be programmed from the host system without requiring any other firmware to be present in the nonvolatile storage 102. Thus, the peripheral controller 102 also manages reprogramming of the nonvolatile storage 102. In the context of this discussion, programming the nonvolatile storage 102 include programming one or more storage devices considered part of the nonvolatile storage 102. The peripheral controller 102 and the system board 100 can be coupled to another system using the port 104. In a preferred embodiment, the port 104 is a USB port.

Figure 3B:
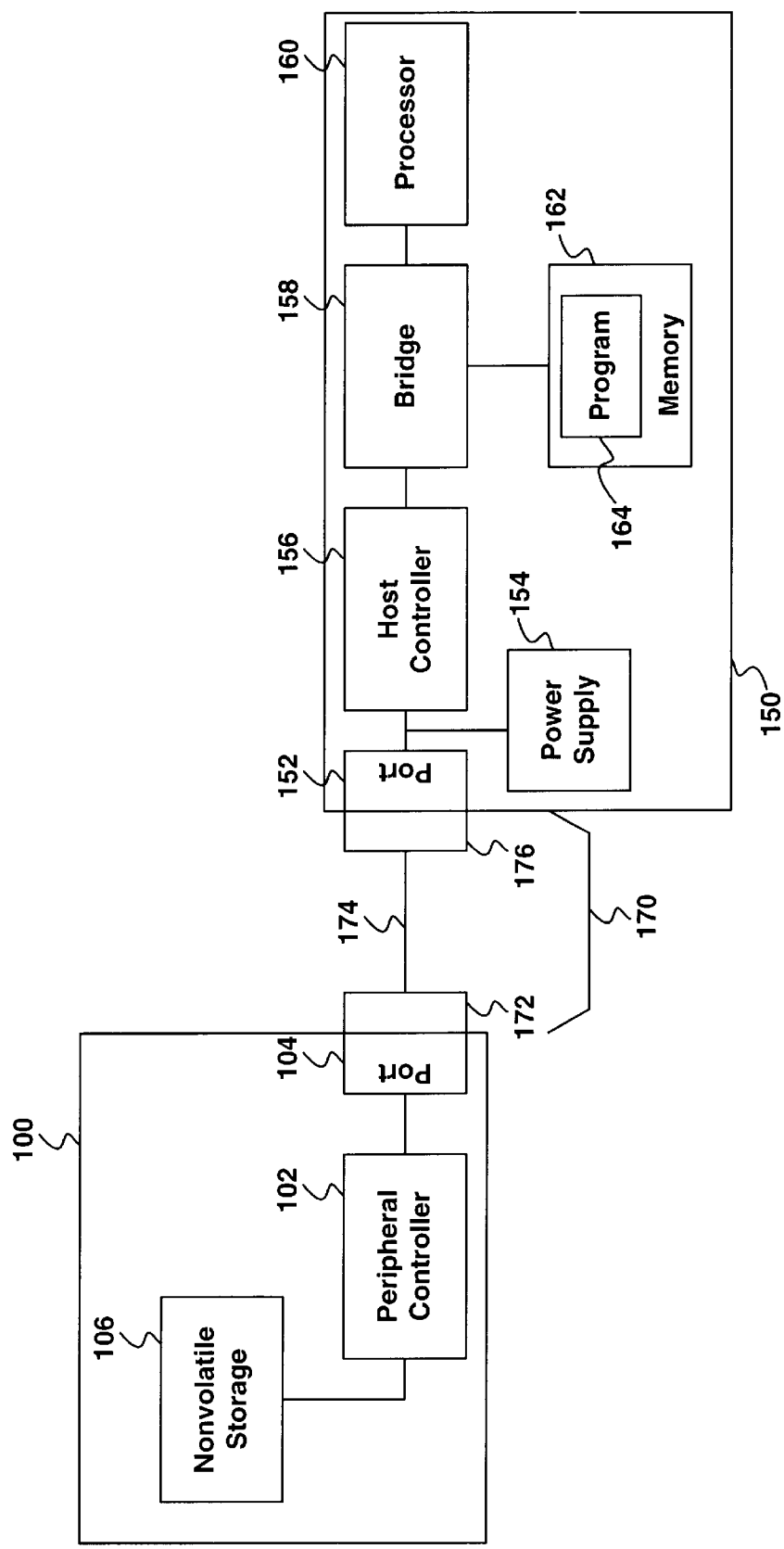
FIG. 3B is a block diagram of the system board in accordance with the present invention coupled to a host that may program the system board.

FIG. 3B depicts the system board 100 coupled with a host 150 through a connector 170. In this configuration, nonvolatile storage 106 in the system board 100 can be programmed. The host 150 includes a port 152 coupled to a host controller 156. The port 152 is preferably a USB port. Similarly, the host controller 156 is preferably a USB host controller. The host controller 156 is coupled with a bridge 158. A processor 160 and memory 162 are coupled to the bridge. The program (s) 164, or firmware, to be provided to the nonvolatile storage is depicted as being stored in the memory 162 of the host 150. The host 150 also includes a power supply 154. Although particular components of the host 150 are depicted, the host may include fewer components, more components, or other components. The host 150 is simply capable of recognizing the system board 100 as a peripheral device that is to be programmed, and providing the appropriate program(s) 164 to the peripheral device. The host 150 is also capable of supplying the system board 100 with other inputs needed for programming. For example, in one embodiment, the host 150 supplies power to the system board 100. Thus, the host 150 is preferably a fully functional computer system.

The connector 170 includes receptacles 172 and 176 and cabling 174. The receptacles 172 and 176 are configured to connect with the port 104 and the port 152, respectively. In one embodiment, both port 104 and 152 are USB type A ports. In such an embodiment, the receptacles 172 and 176 are both USB type A receptacles. In one embodiment, the cabling 174 is compatible with USB interfaces. However, in another embodiment, the cabling is adapted to supply other inputs to the system board 100. For example, the system board 100 may require more current from the host 150 than is allowed by USB specifications. In such a case, the connector 170' would still be capable of providing the required current from the host 150.

Figure 4A:
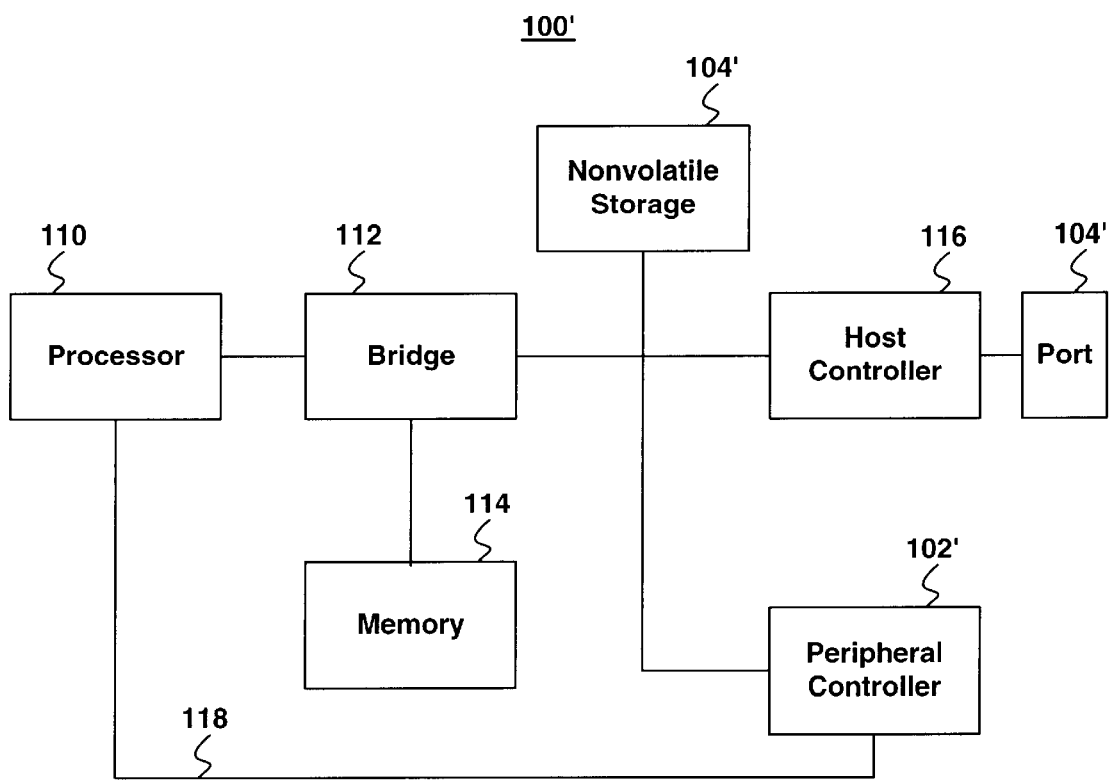
FIG. 4A is a block diagram of another system board in accordance with the present invention.

FIG. 4A depicts another embodiment of a system board 100' in accordance with the present invention. The system board 100' includes many of the same components as the system board 100. Such components are numbered similarly. For example, the system board 100' includes a nonvolatile storage 104' and a peripheral controller 102'. In a preferred embodiment, the peripheral controller 102' is a USB peripheral controller. The peripheral controller 102' allows the system board 100' to behave as a peripheral to a host system (not depicted in FIG. 4A). For example, if the peripheral controller 102' is a USB peripheral controller, the peripheral controller 102' allows the system board 100' to be recognized and treated as a USB peripheral for the host system. The peripheral controller 102' also allows the nonvolatile storage 106' to be programmed from the host system without requiring any other firmware to be present in the nonvolatile storage 106'. Thus, the peripheral controller 102' also manages reprogramming of the nonvolatile storage 106'. In the context of this discussion, programming the nonvolatile storage 106' include programming one or more storage devices considered part of the nonvolatile storage 106'. For example, the nonvolatile storage 106' can include one or more EEPROMs.

The system board 100' also includes bridge 112 coupled with processor 110 and memory 114. The system board 100' also includes a host controller 116 coupled to the port 104'. The host controller 116 allows the system board 100' to operate as a host for devices connected to the port 104'. Thus, the host controller 1 16 allows the system board 100' to recognize, communicate with or control peripheral devices coupled with the port 104'. In a preferred embodiment, the host controller 116 is a USB host controller. Thus, once provided with the appropriate program, or firmware, in the nonvolatile storage 102 and the desired software, the system board 100' can operate in a computer system (not shown). The system board 100' also includes a reset line 118 coupled between the peripheral controller 104' and the processor 110. The reset line 118 may be used to allow the peripheral controller 104' to suspend operation of the processor 110. Note that the system board 100' could include other components (not shown).

Figure 4B:
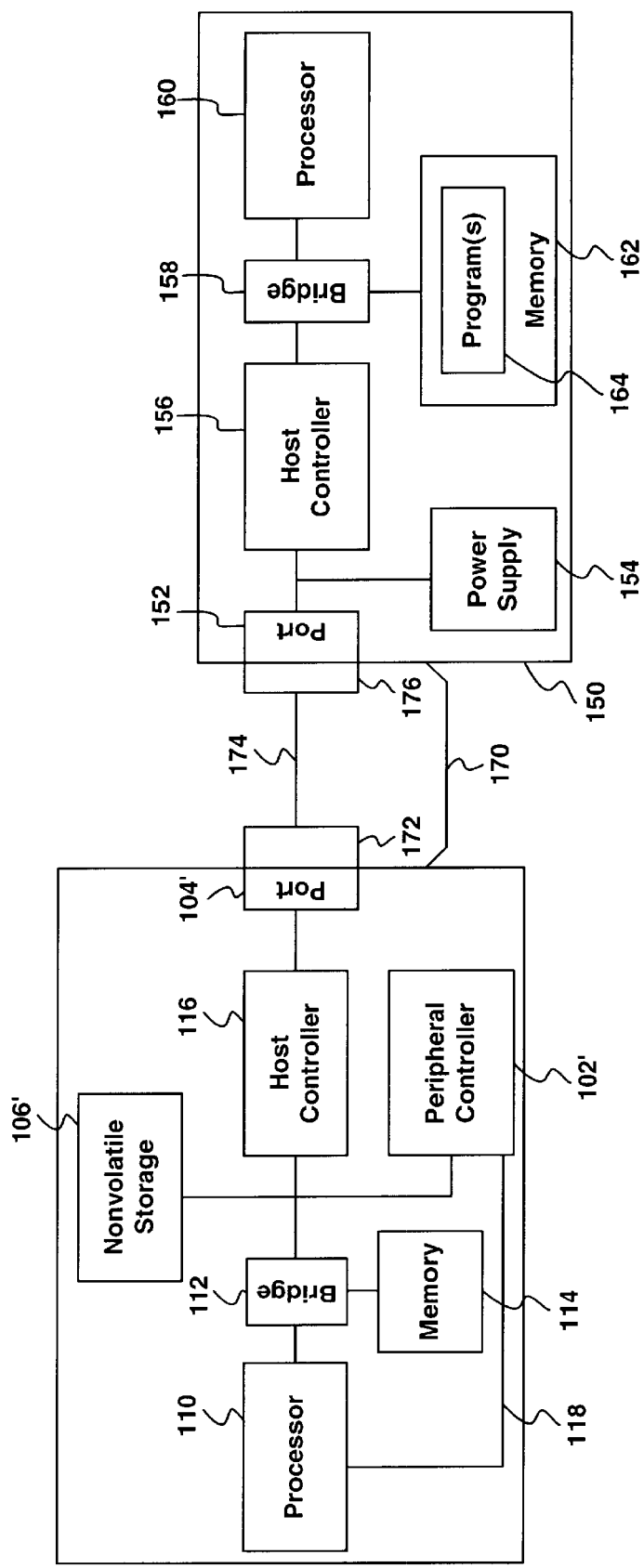
FIG. 4B is a block diagram of the other system board in accordance with the present invention coupled to a host that may program the system board.

FIG. 4B depicts the system board 100' coupled to the host 150 through a connector 170'. In a preferred embodiment, the connector 170' is the same as the connector 170. In this configuration, nonvolatile storage 106' in the system board 100' can be programmed. Thus, firmware can be provided from the host 150 to the nonvolatile storage 106' of the system board 100'.

Figure 5A:
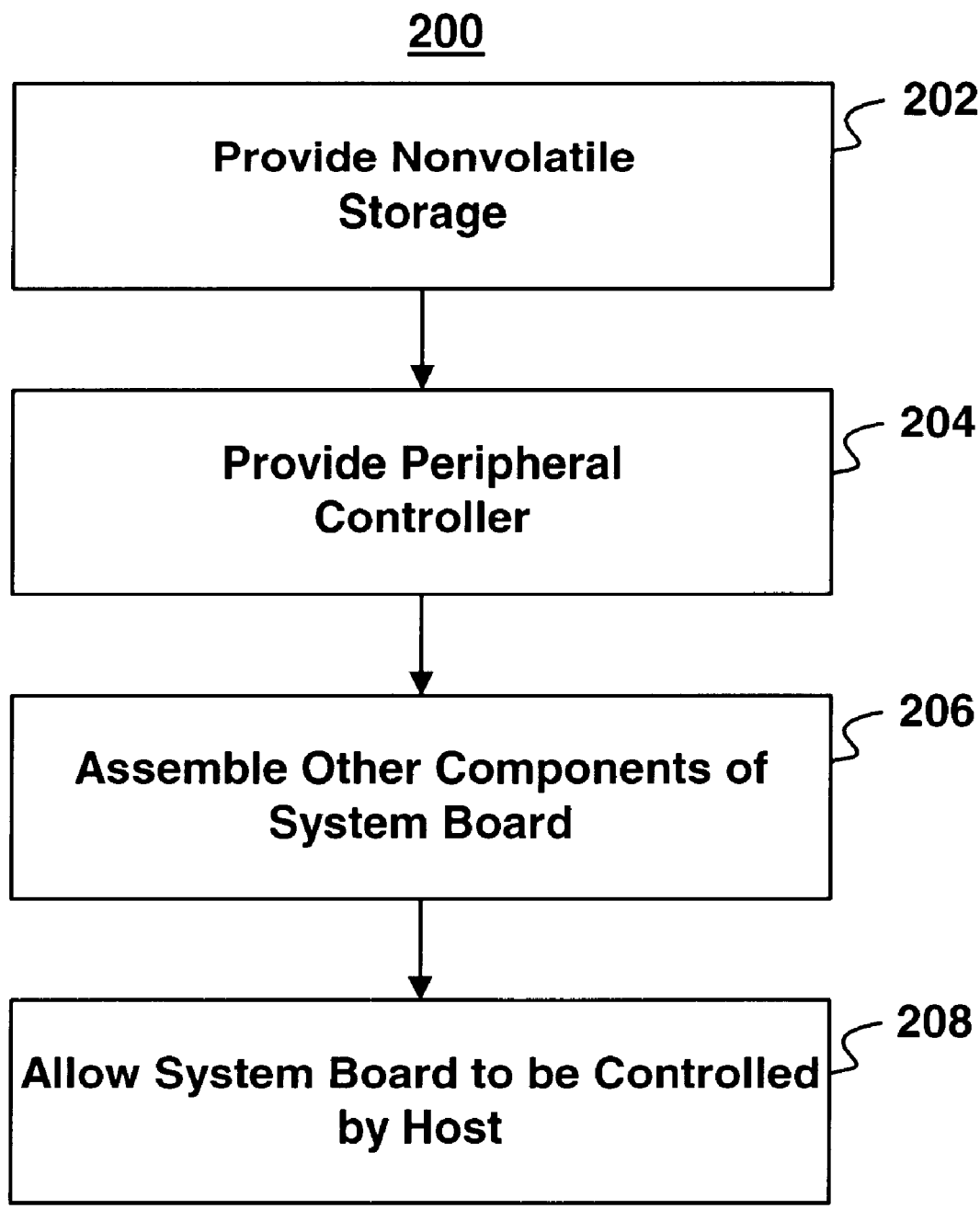
FIG. 5A is a flow chart depicting a method for manufacturing and using a system board in accordance with the present invention.

FIG. 5A depicts a high-level flow chart of one embodiment of a method 200 in accordance with the present invention for manufacturing and utilizing the system board 100 or 100'. For clarity, only some steps of the process are shown. Furthermore, some of the steps in the method 200 could occur in another order. The nonvolatile storage 106 or 106' is provided on the system board 100 or 100', respectively, via step 202. The peripheral controller 102 or 102' is provided, via step 204. Thus, via steps 202 and 204 some of basic components of the system board 100 or 100' are assembled. The other components of the system board 100 or 100' may be assembled, via step 206. The peripheral controller 102 or 102', is used to allow the host 150 to treat the system board 100 or 100' as a peripheral device, via step 208.

Figure 5B:
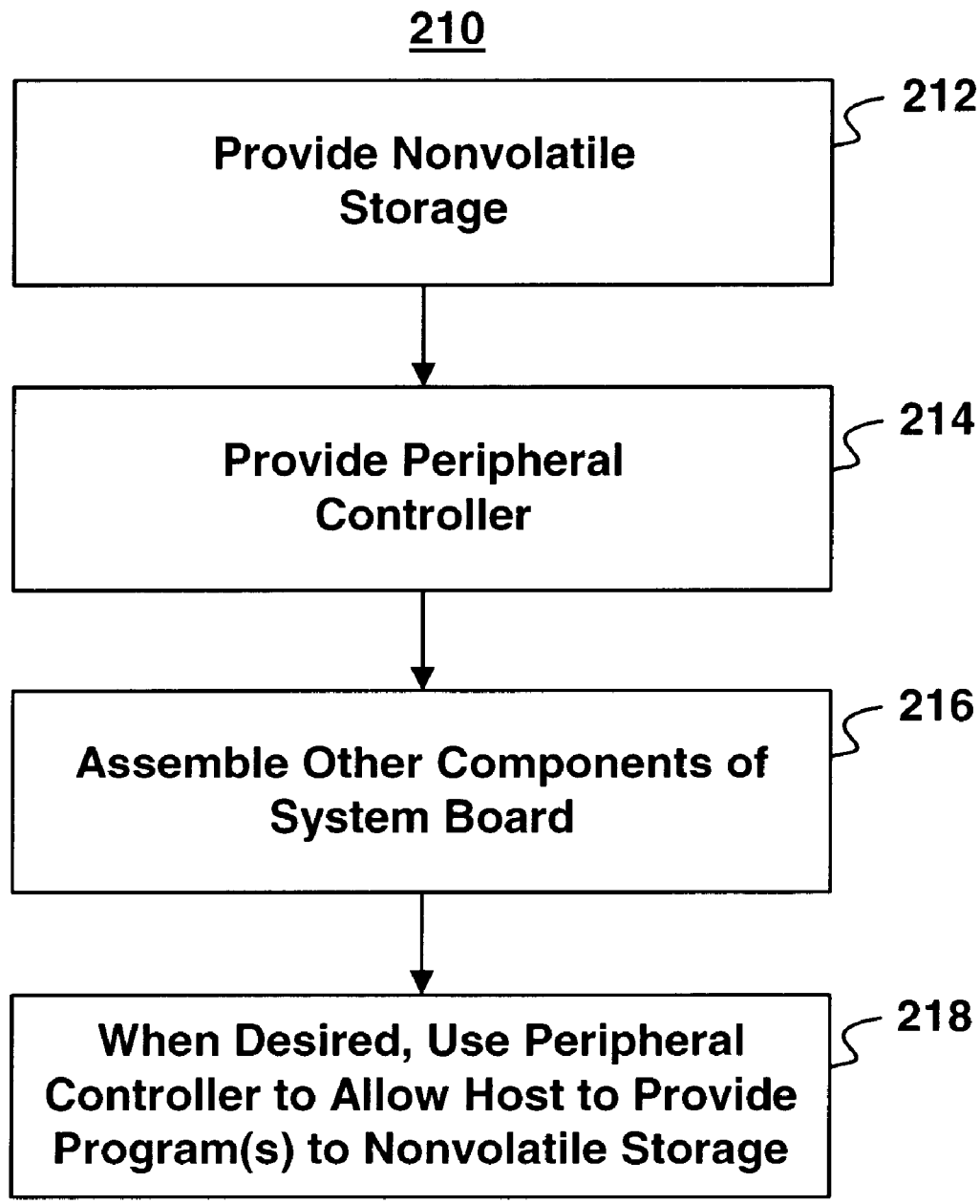
FIG. 5B is a flow chart depicting a method for programming a system board in accordance with the present invention.

FIG. 5B depicts a high-level flow chart of one embodiment of a method 210 in accordance with the present invention for manufacturing, and programming the system board 100 or 100'. For clarity, only some steps of the process for manufacturing and programming the system board 100 or 100' are shown. Similarly, some of the steps of the method 210 could occur in another order. The nonvolatile storage 106 or 106' is provided on the system board 100 or 100', respectively, via step 212. The peripheral controller 102 or 102' is provided, via step 214. Thus, via steps 212 and 214 some of basic components of the system board 100 or 100' are assembled. The other components of the system board 100 or 100' may be assembled, via step 216. When desired, the peripheral controller is used to allow the host 150 to provide the program(s) 164 to the nonvolatile storage 106 or 106', via step 218. Thus, step 218 includes providing firmware to one or more components that can be considered the nonvolatile storage 106 or 106'. In order to provide the program(s) 164 in step 218, the host 150 treats the system board 100 or 100' as a peripheral device. Once the nonvolatile storage 106 or 106' is programmed, the system board 100 or 100' can be placed in a computer system (not shown).

Because the program(s) 164 can be provided to the nonvolatile storage 106 or 106' when desired, the program(s) 164 need not be loaded at one point in the manufacturing process, then updated at a later point in the process. Instead, the step 208 of using the peripheral controller 102 or 102' to load the program(s) 164 from the host 150 can be performed when the system board. 100 or 100' is to be placed in a computer system. Furthermore, the program(s) 164 can be provided to the nonvolatile storage 106 or 106' whether or not the processor 110 and/or the memory 114 has been placed in the system board 100'. Thus manufacturing is simplified and made more cost effective.

Figure 6:
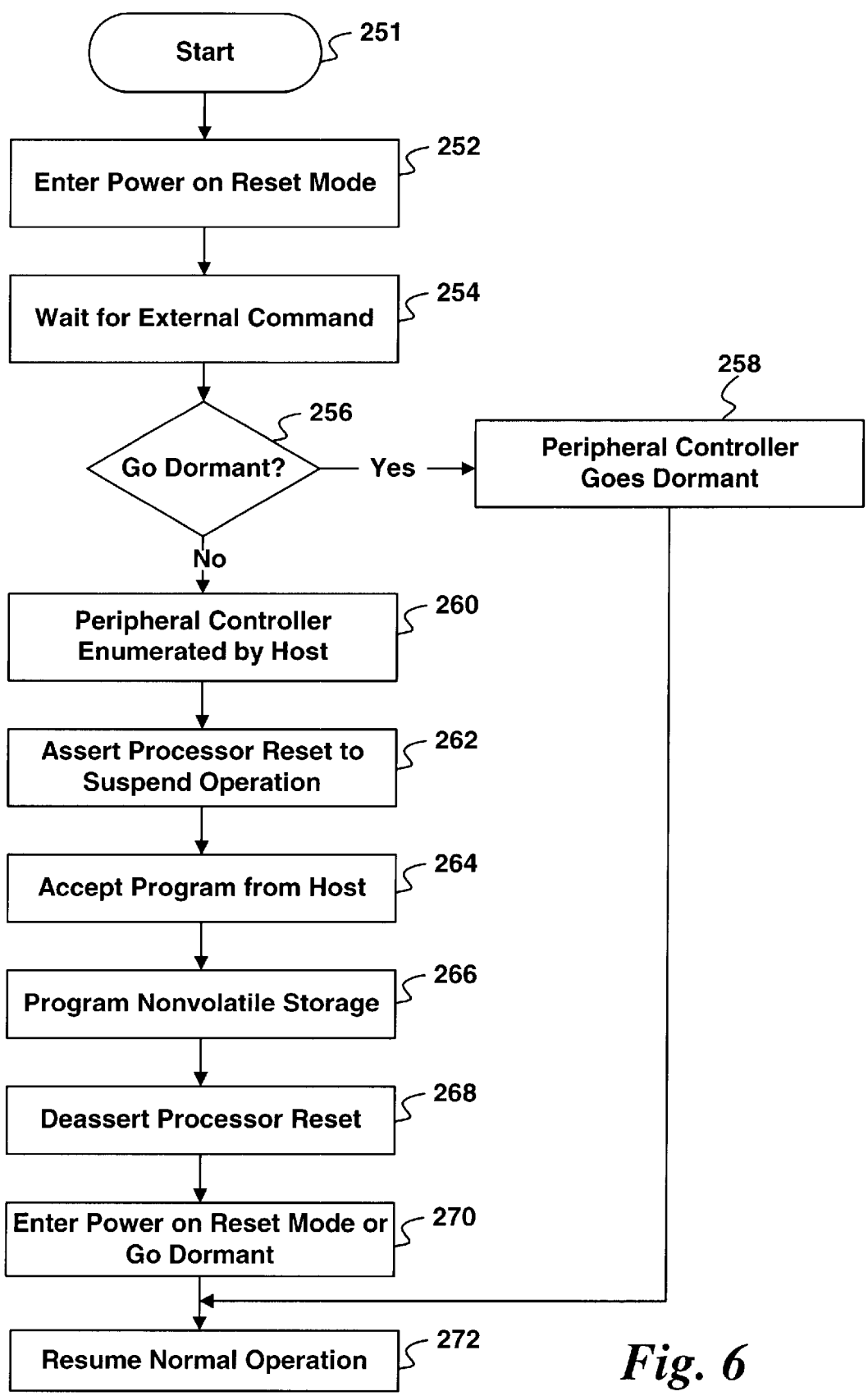
FIG. 6 is a flow chart depicting a method for programming the system board in accordance with the present invention.

FIG. 6 depicts a more detailed flow chart of a method 250 for programming the nonvolatile storage 106 or 106' through the peripheral controller 102 or 102'. The method 250 may be used in performing the step 208 depicted in FIG. 5. Referring back to FIG. 6, the method 250 starts, via step 251, preferably when system board 100 or 100' is provided with power. In one embodiment, power is provided through a power supply that can be coupled to the system board 100 or 100'. In a preferred embodiment, power is provided from the host 150 through the connector 170. Also in a preferred embodiment, step 251 includes providing any other inputs that the system board 100 or 100' requires for operation. For example, if the peripheral controller 102 or 102' is a USB microcontroller, the connector 170, the ports 104 and 104', the port 152 and the host controller 156 of the host 150 are USB compatible. In such a case power would be supplied from the host 150 by +5 and ground cables in the connector 170 and the ports 104, 104' and 152.

When power is supplied, the peripheral controller 102 or 102' enters power on reset mode, via step 252. The peripheral controller 102 or 102' then waits for an external command, via step 254. The external command indicates whether the peripheral controller 102 or 102' will be used to program or reprogram the nonvolatile storage 106 or 106', respectively. For example, the external command may come from a BIOS previously stored in the nonvolatile storage 106 or 106' when the BIOS reaches a certain point in its boot up process. The command from the BIOS would disable the peripheral controller 102 or 102', allowing the system board 100 or 100' to continue with normal operation. In the alternative, the command may be provided by the host 150, indicating that the peripheral controller 102 or 102' will be used to provide the program(s) 164 to the nonvolatile storage 106 or 106', respectively. The peripheral controller 102 or 102' continues waiting step 254 until an external command is received.

It is then determined if the peripheral controller 102 or 102' is to go dormant, via step 256. Step 256 could include receiving the external command from the BIOS, as discussed above. If such a command is received, it would be determined in step 256 that the peripheral controller 102 or 102' is to go dormant. In one embodiment, step 256 includes determining whether a particular time has elapsed without the peripheral controller 102 or 102' receiving a command from the host 150. In such a case, it would be determined in step 256 that the peripheral controller. 102 or 102' is to go dormant because the peripheral controller 102 or 102' has not been recognized and used as a peripheral device by the host 150 within the particular time. Thus, if it is determined in step 256 that the peripheral controller 102 or 102' is to go dormant, then the peripheral controller 102 or 102' goes dormant, via step 258. The system board 100 or 100' may then resume normal operations.

If the peripheral controller 102 or 102' is not to go to sleep, then the peripheral controller 102 or 102' is enumerated by the host 150 as a peripheral device, via step 260. Enumeration includes the peripheral controller 102 or 102' being recognized by the host 150, the device type of the peripheral controller 102 or 102' being determined by the host 150, and the peripheral controller 102 or 102' being allowed to receive input from or provide output to the host 150. Thus, enumeration allows the system board 100 or 100' to act as a peripheral device for the host 150. In a preferred embodiment, peripheral controller 102 or 102' and, therefore, the system board 100 or 100' is enumerated as a device to be programmed in step 260. Where the peripheral controller 100 or 100' is a USB peripheral controller, step 260 thus includes enumerating the peripheral controller 102 or 102' as part of a USB peripheral device for the host 150 that is to be programmed. Once the host 150 enumerates the peripheral controller 102 or 102', the host 150 can control the system board 100 or 100'. Note that the commands used by the host 150 to enumerate the peripheral controller 102 or 102' are the external commands the peripheral controller waits for in step 254.

The peripheral controller 102 or 102' suspends normal operation of the remainder of the system board 100 or 100', respectively, for example by asserting a processor reset on reset line 118, via step 262. The peripheral controller 102' suspends normal operation of the remainder of the system board 100 or 100' in order to prevent the system processor 110 from booting up and using any system resources that may be in the process of being programmed.

The peripheral controller 102 or 102' accepts the program command from the host 150, via step 2,64. In one embodiment, each storage device in the nonvolatile'storage 106 or 106' that receives the program(s) 164 or a portion of the program(s) 164 is considered a separate USB endpoint for the program command provided in step 264. In an alternate embodiment, the entire nonvolatile storage 106 or 106' would be considered to be a separate USB endpoint for the program command provided in step 264.

The peripheral controller 102 or 102' programs the nonvolatile storage 106 or 106', respectively, via step 266. The peripheral controller 102 or 102' thus manages programming of the nonvolatile storage 106 or 106', respectively. In a preferred embodiment, step 266 includes the peripheral controller 102 or 102' writing a byte to a portion of the nonvolatile storage 106 or 106', respectively, checking to determine whether the byte has been written, retrying a particular number of times if the byte has not been written, and proceeding to the next byte when the byte has been written. Thus, the program(s) 164 are provided to the nonvolatile storage 106 or 106' in step 266.

The, peripheral controller 102 or 102' deasserts the processor reset command on line 118, via step 268. The peripheral controller 102 or 102' then reenters power on reset mode, as in step 252, or goes dormant, via step 270. The system board 100 or 100' may then resume normal operation, via step 272. Once step 272 is reached, the system board 100' can then act as a host for other peripheral devices (not shown) using the host controller 116.

Because of the presence of the-peripheral controller 102 or 102', the system board 100 or 100', respectively, can act as a peripheral device for a host, such as the host 150. Thus, the nonvolatile storage 106 or 106' of the system board 100 or 100', respectively, can be provided with the appropriate program(s) 164. The program(s) 164 can be provided to the nonvolatile storage without the processor 110 being placed on the system board 100' or without the processor 110 being used during programming. As a result, the program(s) 164, or firmware, can be provided to the nonvolatile storage 106 or 106' at any time that is desired. Consequently, use of the system board 100 or 100' in manufacturing computer systems is simplified and made more cost effective.

A method and system has been disclosed for programming nonvolatile storage on a system board. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for controlling a computer board to be used in a computer, the system comprising:
   nonvolatile storage for storing a program for the computer board, the nonvolatile storage residing on the computer board; and
   a peripheral controller coupled with the nonvolatile storage and residing on the computer board, the peripheral controller for allowing the computer board to be coupled with a host system and recognized by the host system as a peripheral.

2. The system of claim 1 wherein the peripheral controller further allows the program to be loaded from the host system to and stored in the nonvolatile storage.

3. The system of claim 1 wherein the nonvolatile storage further includes a read only memory.

4. The system of claim 1 wherein the nonvolatile storage further includes a flash memory device.

5. The system of claim 1 wherein the peripheral controller further includes a universal serial bus (USB) peripheral controller.

6. The system of claim 1 wherein the peripheral controller includes a state machine.

7. The system of claim 1 further comprising:
   a processor coupled with the peripheral controller;
   a memory coupled with the processor.

8. The system of claim 1 wherein the peripheral controller further allows the computer board to be recognized by the host system as a peripheral and allows the program to be loaded from the host system to and stored in the nonvolatile storage if the peripheral controller receives a signal from the host system after the computer board is powered on.

9. A method for controlling a system board including a nonvolatile storage for storing a program, the method comprising the steps of:
(a) providing a peripheral controller coupled with the nonvolatile storage and residing on the system board,
(b) coupling the peripheral controller with a host system; and
(c) allowing the system board to be recognized as a peripheral by the host system using the peripheral controller.

10. The method of claim 9 further comprising the step of:
(d) loading the program from the host system to the nonvolatile storage.

11. The method of claim 9 wherein the nonvolatile storage further includes a read only memory.

12. The method of claim 9 wherein the nonvolatile storage further includes a flash memory device.

13. The method of claim 9 wherein the system board further includes a processor, the method further comprising the steps of:
(d) suspending operation of the processor.

14. The method of claim 9 further, comprising the steps of:
(d) providing a processor coupled with the peripheral controller; and
(e) providing a memory coupled with the processor.

15. The system of claim 7 wherein the processor resides on the system board and wherein the program includes firmware for the processor.

16. The system of claim 1 wherein the computer board is a system board.

17. The method of claim 13 wherein the program includes firmware for the processor.

* * * * *